July 27, 1954

E. A. DAVIS 2,684,841

WEIGHT MEASURING INSTRUMENT

Filed Aug. 23, 1950

INVENTOR
EDWARD A. DAVIS

By

Semmes, Keegin, Robinson & Semmes
ATTORNEYS

July 27, 1954
E. A. DAVIS
2,684,841
WEIGHT MEASURING INSTRUMENT
Filed Aug. 23, 1950
2 Sheets-Sheet 2
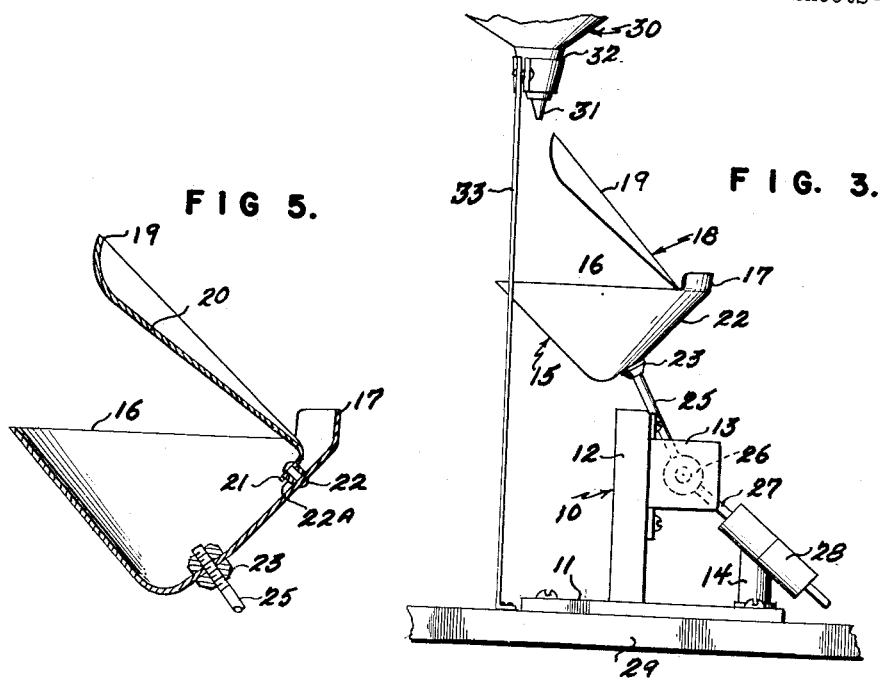
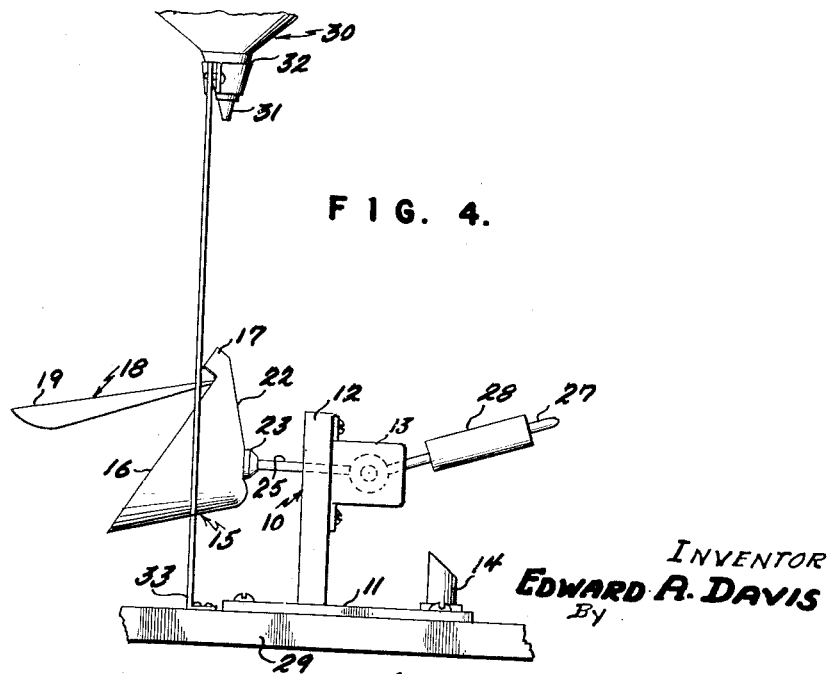
INVENTOR
EDWARD A. DAVIS
By
Semmes, Keegin Robinson & Semmes
ATTORNEYS Patented July 27, 1954

2,684,841

UNITED STATES PATENT OFFICE 2,684,841

WEIGHT MEASURING INSTRUMENT

Edward A. Davis, Harwichport, Mass.

Application August 23, 1950, Serial No. 181,050

5 Claims. (Cl. 265—27)

This invention relates to measuring instruments and has particular reference to mechanical means for measuring quantities of continuous flowing non-gaseous matter such as fluids, grains and other triturated substances.

For years the need has been acute to have means for measuring continuously flowing matter such as fluids, grains and the like. By way of example, for navigators, farmers and others whose successful trade depends upon weather condition, it is desirous to have accurate means for measuring the rainfall in the particular locale, which means is of the very simplest construction commensurate with the ability of the tradesman to own and operate. It is known that many devices presently exist, for instance, for measuring the amount of rainfall which occurs in certain specific locales, however each of the instruments previously devised for such purposes is not practical for the average farmer either because of the tremendous amount of expense involved in purchasing or because of the inefficiency of operation of some of the more simple devices presently used.

The problems confronting research chemists, doctors, pharmacists, physicists and others could well be simplified through employment of means for effecting absolutely accurate measurement of triturated substances from continuously moving sources of such substances.

An instrument of the present type has innumerable uses such as the measuring of continuously flowing granular materials in the packing, pharmaceutical and medical trades wherein the accuracy of measurement of triturated substances is of the essence in the mixing of container content, prescriptions and the like. Other uses are apparent when it is considered that a strong need has existed for a long time in the continuous measuring of materials for filling of wagons, grain sacks, cartons and the like with granular and other similar substances falling within the category of granulated or granular materials. Where ease of filling and accuracy of measurement is required, the present invention fulfills the need.

The problem involved in measuring continuously flowing matter of the non-gaseous type is that of obtaining accurate measurement and depositing of such measurements avoiding losing any of the continuously flowing material and of having a continual measurement taking place concurrently with the flow of the material from any given point to another. The applicant is aware that such inventors as Moore and Hildebrand have devised means for measuring continuously flowing matter in their respective Patents Nos. 1,308,855 and 2,202,452. The former inventor has conceived the broad idea of continuously gathering matter from the source to activate a pivot receptacle. This inventor, however, employs excesses of flowing matter to actuate the apparatus. The distinctions existing between applicant's device and the very complex structure contemplated by Hildebrand will appear obvious to one skilled in the art.

In view of the foregoing, therefore, it is an object of this invention to provide means for accurately measuring continuously flowing non-gaseous matter.

Yet another object of this invention is to provide a unique and simple mechanical means for gathering, measuring and depositing non-gaseous moving matter avoiding loss of any of the matter upon deposit of the matter after measuring.

Still another object of the invention is to provide means for continuously gathering and depositing moving matter from a source to a point of deposit wherein auxiliary gathering means is constructed to obtain collection from the source simultaneously upon depositing of gathered materials from out of a primary gathering means, the said auxiliary means being adapted to deposit its content into the original gathering means for measuring and deposit.

Yet another object of the invention is to provide a dual receptacle means for measuring non-gaseous moving matter wherein the receptacles employed are disposed to complement one another in the performance of accurately measuring such moving matter.

A further and more advanced object of the invention is to provide means for enabling the actuation of matter receptacle elements adapted to measure continuously moving matter and to return the same from a point of deposit to a point of gathering, to retain the sequence of actuation without loss of matter.

Yet another object of the invention is to provide composite receptacle means for gathering, measuring and depositing non-gaseous moving matter continuously wherein main and auxiliary receptacle elements simultaneously and concurrently gather, deposit matter and return to point of gathering for repetition of the cycle.

To render the invention more readily understandable, reference is made to the drawings and to the ensuing description of the invention. In the drawings:

Figure 3 is a side elevational view of the invention showing the specific relationship of the collection and gathering elements as appear in an initial stage of operation;

Figure 4 is a side view of the invention illustrating an advanced stage of operation of the instrument; and Figure 5 is a view in enlarged cross section of the auxiliary receptacle means shown in the foregoing drawings.

Figure 1:
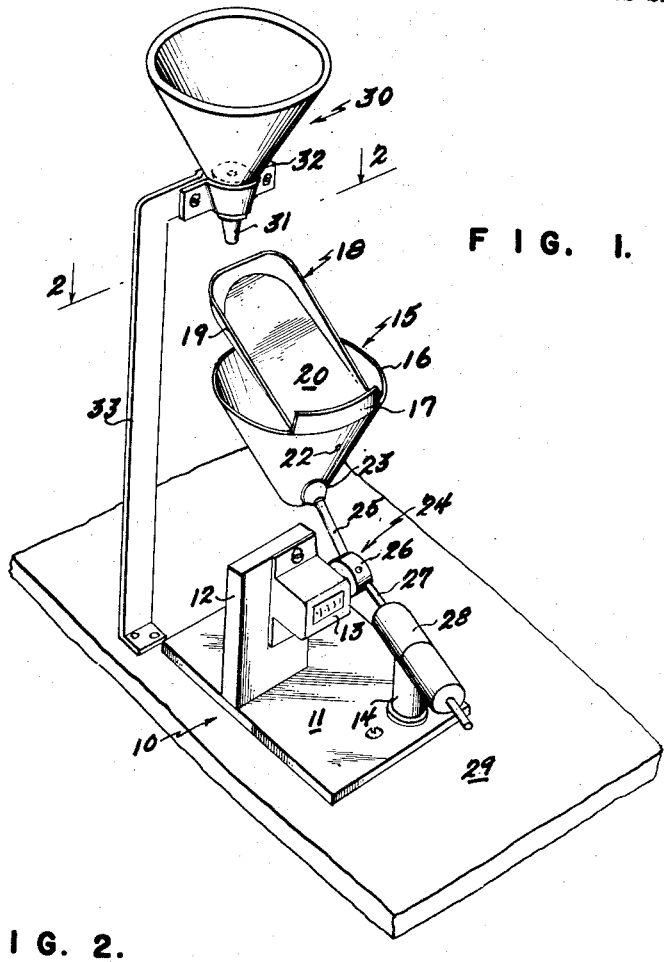
Figure 1 is a view in perspective of the invention.

Specifically, there is shown in Figure 1 a preferred form of the invention wherein the device 10 is mounted upon a block 11 having a stanchion 12. The stanchion 12 supports a counter 13 having a trip axle secured thereto for mounting the fulcrum of the instrument. A block 14 is shown to be positioned beneath the resting point of a counter-weight hereinafter described.

The essential elements of the invention comprise a main receptacle 15 which may be formed of any suitable shape such as conical or frusto-conical and an auxiliary pan-like receptacle 18 secured to the main receptacle. Receptacle 15 has an upper rim 16 at its open end extremity extending substantially peripherally about the receptacle. A portion of the periphery of the receptacle carries a flange 17 which projects upwardly. Guide flange 17, it will be noted, has an arcuate width commensurate with the width of the auxiliary receptacle, and the positioning of the inclined receptacle upon the main receptacle is therefore critical.

Secured to the main receptacle, an auxiliary receptacle 18 is provided with an outer rim 19 forming a substantial cup-like wall about a relatively trough-like pan 20. An extension of pan 20 is bent upon itself at a lower portion 21 to form a supporting flange. As illustrated in Figure 5, flange 21 is secured to the internal wall of the main receptacle as at 22 through rivet means, a separating collar 22a being interposed between the flange 21 and the interior of the wall of the main receptacle. Briefly, it is essential to maintain flange 21 separate in spaced relation to the wall of the main receptacle so that fluid materials passing from the auxiliary receptacle to the main receptacle may have a relatively unimpeded flow to the latter upon return to battery.

The main receptacle is secured to a fixed linkage which is pivotally mounted upon the counter and stanchion. It will be noted that the receptacle unit may be secured as at 23 to arm 25 projecting angularly downwardly of the main receptacle wall to lend support thereto and to provide upright position to the receptacle as the instrument rests in battery. As best shown in Figure 1, the linkage 24 comprises an arm 25, fulcrum 26 and extension arm 27. Extension arm 27 projecting outwardly of the fulcrum and away from the receptacle portions of the instrument is adapted to carry a counterweight 28, which counterweight provides sufficient force to maintain unfilled receptacles in battery and to return the receptacle elements of the invention into battery after movement out of battery by the gravitational forces imposed through the direction of matter therein.

Figure 2:
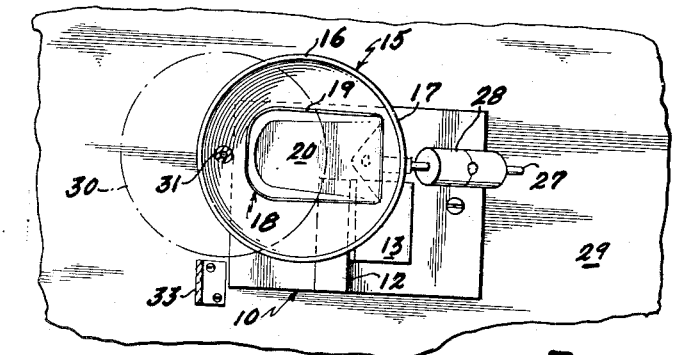
Figure 2 is a top plan view of the invention taken along the line 2—2 of Figure 1.

The positioning of a collection element 30 is particularly critical to the present invention. As best shown in Figures 2 and 3, the collection element 30 may be any suitable funnel type instrument mounted as at 33 or upon a housing encompassing the instrument. Preferably this collection instrument has a nipple 31 of an inner diameter commensurate with the preferred rate of flow of matter into the measuring instrument. Placement of the collection element and nipple 31 must be such that the material flowing from the collection instrument shall pass into the main receptacle to fill the same when the instrument is in battery. Upon filling of the main receptacle to a point where the load and weight of receptacles just exceeds the thrust of the counterweight, the excessive weight obtained through the filling will throw the instrument out of battery. In throwing the instrument out of battery, the auxiliary receptacle being fixed to the main receptacle is thereby placed in position for gathering of the continuously flowing matter, liquid or solid.

The foregoing functions may be more readily appreciated upon reference to Figures 3 and 4 of the drawings. In Figure 3 there is shown a preferred form of the invention wherein the receptacle elements comprising the invention are in battery position. Here it will be noted the nipple 31 of the collection element 30 is directed vertically downwardly toward an outer portion of receptacle 15 between rims of the two receptacles. Upon accumulation of materials in the collection element they are continuously moved downwardly from the extrusion portion 31 into the main receptacle to initially fill the same to weight capacity. Upon filling of receptacle 15, the weight obtained thereby tends to force the united receptacle elements arcuately downwardly and to thrust the counterweight arcuately upwardly until the contents of the main receptacle have been deposited outwardly thereof.

Referring specifically to Figure 4 wherein the instrument is moved wholly out of battery, attention is again directed to the stable positioning of the extrusion portion of collection element 30 with respect to the united receptacle elements. The continuously flowing matter passing through extrusion portion 31 flows toward the innermost extension of the auxiliary receptacle 18 and matter passing thereto will be gathered thereby, the content passing downwardly along base 20 and will be contained by walls 19 of the auxiliary receptacle.

Contents of the main receptacle being dissipated, the counterweight forces tend to overthrow balance to force the combined receptacle elements of the instrument arcuately upwardly again into battery.

As the instrument is returned to battery, the accumulative deposit of moving matter into the auxiliary receptacle is thereafter shifted from its position in the cup portion of the auxiliary receptacle to the inner extremity thereof, being flushed against the peripheral flange 17 of the main receptacle and passed downwardly into the main receptacle. From the foregoing it will appear that gathering of moving matter occurs continuously as the auxiliary and main receptacles are shifted. The particular structure of the auxiliary receptacle permits gathering during the return up to the point where the main receptacle is so positioned that no loss of matter will occur on gathering. Positioning of receptacle to receptacle is therefore critical.

From the above it will be appreciated that upon gathering and deposit of the materials from the main receptacle outwardly thereof and from the auxiliary receptacle to the main receptacle, there occurs absolutely no loss of matter which is continuously moving from the collection source 30. Although the instrument is constantly in a state of readiness to move from battery to out of battery position or is in the process of moving from one position to the other, the continuously moving media finds a receptacle, the content of which has not been previously measured.

An expedient for measuring the amount of content which has passed through the several receptacles in any given amount of time may be determined by the actuation of a counter through the arcuate passage of linkage 24 from battery to out of battery position.

From the foregoing it will be apparent that the material handling cycle of the main receptacle is continuous while that of the auxiliary receptacle is discontinuous, the latter being normally laterally of the vertical path of the material and only being shifted transversely into its path when the main cup 16 has filled and tilts to discharge. Thus if the lips of the main cup be projected by parallel lines the auxiliary receptacle held therewithin would be circumscribed, thereby allowing space between the outside of the lip of the auxiliary receptacle and the inside of the lip of the main receptacle for the vertical stream of material normally to pass into the main receptacle. This condition obtains except when the main receptacle discharges, at which stage the auxiliary receptacle shifts transversely into the path of the material and runs its discontinuous cycle described hereinabove.

While the invention has been described in its preferred form and has been directed to specific uses, it is to be understood that various modified forms of the invention may be made without departing from the spirit thereof or the allowable scope as defined in the appended claims.

I claim:

1. A measuring device of the character described including, in combination, a support, a receptacle open at its top and pivotally mounted on said support to swing in a vertical plane from an elevated position in which the receptacle is adapted to receive and gather material dropped into the receptacle to a lowered position in which the receptacle is in sufficiently upset position to spill out of its top material that has been received in the receptacle when it was in its elevated position, a pan member secured to the receptacle to move therewith, said pan extending partway across the receptacle top a distance leaving an inlet space between the front end of the pan member and the front end of the receptacle for admission of material therethrough into the receptacle, said pan member being so positioned on the receptacle that when the receptacle is in its elevated position the pan member is inclined downwardly from its front end to its rear end thereby to discharge materials from its rear end into the receptacle, said receptacle when swung into its lowered and spilling position carrying said pan member in position to catch and gather material which otherwise would drop through said inlet space into said receptacle, said pan being inclined downwardly, from its rear end to its front end when the receptacle is in its lowered position.

2. A measuring device as set forth in claim 1 and in which said receptacle is offset laterally from its pivot point.

3. A measuring device as set forth in claim 1 and in which counterbalance means are pivotally mounted upon the support, said counterbalance means being fixedly connected to said receptacle normally holding the receptacle in its elevated position.

4. A measuring device as set forth in claim 3 and in which said counterbalance means are adapted to hold said receptacle in elevated position up to a predetermined weight of material in the receptacle and to allow gravity to move said receptacle to its lowered position as soon as the material in the receptacle reaches said predetermined weight.

5. A measuring device as set forth in claim 4 and in which the rear edge of the receptacle has a baffle flange opposite the rear end of the pan member in position to deflect downwardly material flowing from the rear end of the pan member.

References Cited in the file of this patent

UNITED STATES PATENTS

| Number | Name | Date |
|---|---|---|
| 187,813 | Cherry | Feb. 27, 1877 |
| 585,981 | Richards | July 6, 1897 |
| 749,027 | Clarke | Jan. 5, 1904 |
| 1,011,575 | Carter | Dec. 12, 1911 |
| 1,456,631 | Elfreth | May 29, 1923 |
| 1,596,472 | Wharton | Aug. 17, 1926 |
| 2,064,306 | Hapgood | Dec. 15, 1936 |